United States Patent
Oikawa

(10) Patent No.: US 8,775,165 B1
(45) Date of Patent: Jul. 8, 2014

(54) PERSONALIZED TRANSLITERATION INTERFACE

(75) Inventor: Takuya Oikawa, Koganei (JP)

(73) Assignee: Google Inc., Mountain View, CA (US)

( * ) Notice: Subject to any disclaimer, the term of this patent is extended or adjusted under 35 U.S.C. 154(b) by 213 days.

(21) Appl. No.: 13/413,538

(22) Filed: Mar. 6, 2012

(51) Int. Cl.
G06F 17/28 (2006.01)

(52) U.S. Cl.
CPC .................................. G06F 17/28 (2013.01)
USPC .......................................................... 704/10

(58) Field of Classification Search
CPC ....................................................... G06F 17/28
USPC ............................................................ 704/2, 10
See application file for complete search history.

(56) References Cited

U.S. PATENT DOCUMENTS

| | | | |
|---|---|---|---|
| 6,275,789 B1 * | 8/2001 | Moser et al. ................... | 704/7 |
| 7,634,720 B2 | 12/2009 | Haluptzok et al. | |
| 8,010,465 B2 | 8/2011 | Badger et al. | |
| 8,380,486 B2 * | 2/2013 | Soricut et al. ................. | 704/2 |
| 8,468,149 B1 * | 6/2013 | Lung et al. ..................... | 707/713 |
| 2009/0327313 A1 | 12/2009 | Kung et al. | |
| 2010/0106704 A1 | 4/2010 | Josifovski et al. | |
| 2010/0217795 A1 | 8/2010 | Hong | |

OTHER PUBLICATIONS

Just Systems ATOK 2010 for Windows User Manual, 54 pages.

* cited by examiner

*Primary Examiner* — Susan McFadden
(74) *Attorney, Agent, or Firm* — McDermott Will & Emery LLP

(57) ABSTRACT

A transliteration interface that allows active personalization by a user is described. The personalized transliteration interface receives an input word in one language from a user and provides candidate words in a second language that are homophones of the input word. The interface is configured to receive a user annotation associated with a candidate word. The annotations may be stored in a memory. The personalized transliteration interface provides the annotations with the candidate words when the candidate words are provided thereafter. The personalized transliteration interface is also configured to receive a user reordering, which specifies where in a list of candidates the associated candidate word is to be displayed. The personalized transliteration interface is also configured to receive a user omit parameter, which causes the associated candidate word to be omitted from a list of candidate words.

20 Claims, 6 Drawing Sheets

| 610 | 1 | 卓也 ～602 | ⇧⇩ 606 |
| 612 | 2 | タクヤ ～604 | ⇧⇩ 608 |
| | 3 | 卓哉 | ⇧⇩ |
| | 4 | 拓哉 | ⇧⇩ |
| | 5 | たくや | ⇧⇩ |
| | 6 | 拓也 | ⇧⇩ |
| | 7 | 琢也 | ⇧⇩ |
| | 8 | 宅や | ⇧⇩ |
| | 9 | 卓哉 | ⇧⇩ |
| Edit | | | 2/21 |

FIG. 6A

| 610 | 1 | タクヤ ～604 | ⇧⇩ |
| 612 | 2 | 卓也 ～602 | ⇧⇩ |
| | 3 | 卓哉 | ⇧⇩ |
| | 4 | 拓哉 | ⇧⇩ |
| | 5 | たくや | ⇧⇩ |
| | 6 | 拓也 | ⇧⇩ |
| | 7 | 琢也 | ⇧⇩ |
| | 8 | 宅や | ⇧⇩ |
| | 9 | 卓哉 | ⇧⇩ |
| Edit | | | 2/21 |

FIG. 6B

PERSONALIZED TRANSLITERATION INTERFACE

BACKGROUND

There are thousands of languages in the world today. Each of those languages is written and spoken in ways different from the others. Not all languages are mapped onto an input device, such a keyboard. Indeed, in many languages, there are far too many ideographic characters (i.e., the way a character is written) to map on an input device. In some languages, multiple ideographic characters can be pronounced the same way, even though the different characters mean different things.

SUMMARY

One implementation of the disclosure relates to a computerized method of annotating a candidate word in a user interface. The user interface is configured to receive an input word in a first language and provide candidate words in a second language. The method comprises receiving, at a processing circuit, in the user interface an input word in the first language. The method further comprises providing display data configured to cause an electronic display to display a list of candidate words in the second language. The candidate words are homophones of the input word. The method further comprises receiving, at the processing circuit, a user annotation about a candidate word. The method further comprises associating, at the processing circuit, the user annotation with the candidate word. The method further comprises storing, in the memory, the user annotation and the association with the candidate word. The method further comprises providing display data configured to cause an electronic display to display the user annotation when the candidate word is provided thereafter.

Another implementation of the disclosure relates to a tangible computer-readable storage medium having instructions stored thereon that, when executed by a server computer, cause the server computer to perform certain operations. The operations comprise communicating with a user interface on a client device. The user interface is configured to receive an input word in a first language from a user, to provide to the user candidate words in a second language that are homophones of the input word, and to receive a user annotation associated with a candidate word. The operations further comprise receiving, from the client device, the user annotation associated with the candidate word. The operations further comprise storing the user annotation associated with the candidate word in a server-side memory operably coupled to the server computer. When a candidate list is compiled thereafter, the user annotation is displayed proximate to the candidate in the candidate list.

Another implementation of the disclosure relates to a tangible computer-readable storage medium having instructions stored thereon that, when executed by a server computer, cause the server computer to perform certain operations. The operations comprise communicating with a user interface on a client device. The user interface is configured to receive an input word in a first language from a user, to provide to the user candidate words in a second language that are homophones of the input word, and to receive a user parameter to omit a candidate word from a candidate list. The operations further comprise receiving, from the client device, the user omit parameter. The operations further comprise storing the user omit parameter in a server-side memory operably coupled to the server computer. When a candidate list is compiled thereafter, the candidate list omits the candidate word associated with the user omit parameter.

Another implementation of the disclosure relates to a tangible computer-readable storage medium having instructions stored thereon that, when executed by a server computer, cause the server computer to perform certain operations. The operations comprise communicating with a user interface on a client device. The user interface is configured to receive an input word in a first language from a user, to provide to the user candidate words in a second language that are homophones of the input word, and to receive a user reordering of a candidate word in a candidate list. The operations further comprise receiving, from the client device, the user reordering. The user reordering specifies a fixed position for the candidate word or a position relative to a second candidate word in a candidate list. The operations further comprise storing the user reordering in a server-side memory operably coupled to the server computer. When a candidate list is compiled thereafter, the candidate word is displayed in the position specified by the user reordering.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 4, 5A-5B, 6A-6B, and 7A-7B are display images of an interface for personalizing transliteration candidates, including annotating, reordering, and omitting candidates, according to illustrative implementations.

FIG. 4 is a display image of an interface for selecting among personalization options in a personalized transliteration interface, according to an illustrative implementation.

FIG. 5A is a display image of a personalized transliteration interface for annotating transliteration candidates, according to an illustrative implementation.

FIG. 5B is a display image of a personalized transliteration interface after a transliteration candidate has been annotated, according to an illustrative implementation.

FIG. 6A is a display image of a personalized transliteration interface for reordering transliteration candidates, according to an illustrative implementation.

FIG. 6B is a display image of a personalized transliteration interface after candidates have been reordered, according to an illustrative implementation.

FIG. 7A is a display image of a personalized transliteration interface for omitting transliteration candidates, according to an illustrative implementation.

FIG. 7B is a display image of a personalized transliteration interface after a candidate has been omitted, according to an illustrative implementation.

DETAILED DESCRIPTION

Transliteration tools can be used to input text into a computing device for languages that are not mapped onto input devices. Transliteration may refer to the phonetic spelling (i.e., spelling how a word sounds) of a word in one language using the letters, characters, or symbols of another language. For example, Chinese pinyin is commonly used in the transliteration of Chinese. Chinese pinyin is a system of writing Chinese words with Roman/Latin letters. With transliteration, traditional Chinese (hanzi) characters may be transcribed into Roman/Latin letters. Transliteration tools can convert text from one written language system into another written language system. Transliteration tools may allow a user to phonetically spell a word, phrase, or sentence using one language and attempt to deduce what characters or symbols in the second language system were intended by the user. Once the phonetic spelling of a word is received by the transliteration tool, it may provide the user with homophones of the word. A homophone is a word that sounds the same as another word but has a different meaning. With a list of homophones of the phonetically-spelled word provided by the transliteration tool, a user is able to choose the homophone that he or she intended.

One or more embodiments may relieve the user from having to remember which ideographic character is used in a particular context. A person's name is an example. In Japanese, the name "Takuya" can be written with many different character sets. "Takuya" could be "卓也," "拓也," "拓哉," "琢也," or "卓哉," among others. Each of these character sets is pronounced the same. But only one character set is used to a spell a particular person's name. A user may have to search the internet, check exchanged business cards, or look at notes from a business meeting to remember the correct character to use.

According to some aspects of the present disclosure, a transliteration interface for receiving a word from a user in a first language and providing to the user candidate words in a second language is configured to be actively personalized by the user. In some implementations described herein, a personalized transliteration interface enables a user to annotate transliteration candidates. A candidate word may be annotated with a text string that, e.g., reminds the user that the particular candidate is used in a particular context. In other implementations, a single character, such as an asterisk, next to a particular candidate word can be used to draw a user's attention. In some implementations, candidate words may be reordered so that a candidate word may be positioned where the user prefers. In other implementations, a candidate word that the user never uses may be omitted. A user's annotations, reorderings, and omit parameters may be accessed by the user on different client devices, according to some implementations.

Figure 1:
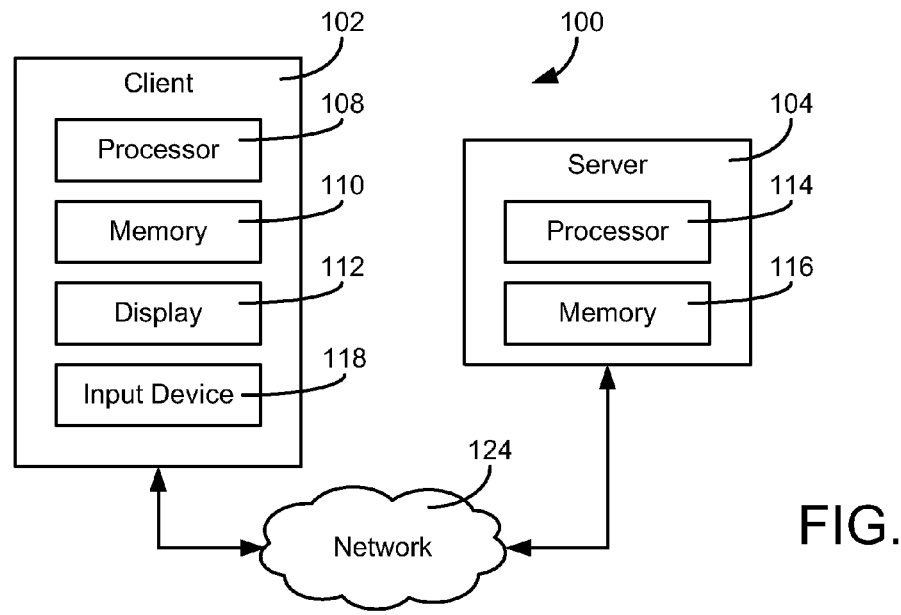
FIG. 1 is a block diagram of a environment associated with a personalized transliteration interface, according to an illustrative implementation.

FIG. 1 illustrates a block diagram of the environment 100 associated with a personalized transliteration interface according to an illustrative implementation. Environment 100 includes a client device 102 that communicates with other computing devices via network 124. For example, client 102 may communicate with server 104. Though FIG. 1 depicts one server, in other implementations no server or more than one server may be utilized. Server 104 may provide candidate words, annotations, and other content relating to a personalized transliteration interface to client 102. Though FIG. 1 depicts only one client 102, other implementations may contain more than one client device.

Network 124 may be any form of computer network that relays information between client 102 and server 104. For example, network 124 may include the Internet and/or other types of data networks, such as a local area network (LAN), a wide area network (WAN), a cellular network, satellite network, or other types of data networks. Network 124 may also include any number of computing devices (e.g., computers, servers, routers, network switches, etc.) that are configured to receive and/or transmit data within network 124. Network 124 may further include any number of hardwired and/or wireless connections. For example, client 102 may communicate wirelessly (via, e.g., WiFi, cellular, radar, etc.) with a transceiver that is hardwired (via, e.g., a fiber optic cable, a CAT5 cable, etc.) to other computing devices in network 124.

Client 102 may be any number of different electronic devices configured to communicate via network 124 (e.g., a laptop computer, a desktop computer, a tablet computer, a smartphone, a digital video recorder, a set-top box for a television, a video game console, etc.). Client 102 is shown to include a processing circuit, which may comprise a processor 108 and a memory 110.

Client 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). For example, client 102 may include an input device 118, that enables a user to input text in a personalized transliteration interface. In some implementations, input device 118 may be language-specific. For example, an input device such as a keyboard may be configured to input Japanese hiragana characters. The one or more user interface devices may be internal to the housing of client 102 (e.g., a built-in display, microphone, etc.) or external to the housing of client 102 (e.g., a monitor connected to client 102, a speaker connected to client 102, etc.), according to various implementations. For example, client 102 may include an display device 112, which visually displays a personalized transliteration interface.

Server 104 is an electronic device connected to network 124 that may provide content to client 102. Server 104 may be one or more of FTP servers, file sharing servers, web servers, or other devices that include a processor 114. Content may include, but is not limited to, transliteration candidates and annotations for a personalized transliteration interface. Server 104 may also include a memory 116.

In various illustrative implementations, some or all of the functionality of the personalized transliteration interface may be provided on server 104 and/or on client device 102. For example, in some implementations, an application may be provided on client device 102 that receives input from a user and transmits the input to a server-based transliteration system that is configured to convert the input into one or more output options in a second language system or format and provide the output options to client device 102. In some implementations, the personalized transliteration interface may be provided from a server 104 to a client 102 via a web-based application and/or an application resident on a client device 102. In some implementations, client device 102 may be designed to use various types of software and/or operating systems embodied on one or more tangible media. In other implementations, the data stored on client device 102 may be synchronized with the data stored in server 104. In some implementations, some or all of the functionality may be performed on client devices 102. In one implementation (e.g., a client-based transliteration interface), personalized transliteration interface may be implemented entirely within memory 110 of client 102 (e.g., as instructions stored in memory 110 that are executable by processor 108).

In some implementations, part or all of a personalized transliteration interface may be implemented within client devices 102. For example, a client-side transliteration system may be implemented fully within client device 102 such that language conversions can be obtained when client devices 102 do not have connectivity to network 124. In some implementations, part of all of a personalized transliteration interface may be implemented within one or more server devices 104 (e.g., cloud-based implementations), and client devices 102 may be configured to provide an interface through which to communicate with the server devices. In some implementations, both client-based and cloud-based implementations may be provided. For example, a smaller, more limited dictionary (e.g., general and/or user-specific) may be provided in a local memory of client devices 102 that may be used to provide fast conversion results and/or when client devices 102 do not have connectivity to network 124, and a larger, more comprehensive dictionary may be provided using server computing devices accessible to client devices 102 via network 124.

Figure 2:
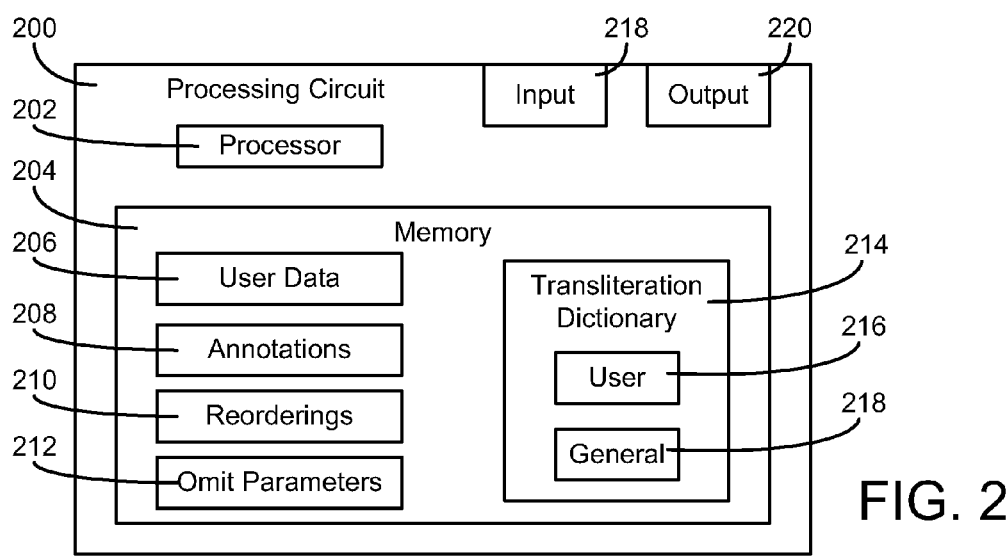
FIG. 2 is a block diagram of a processing circuit configured to receive, associate, store, and provide annotations, reorderings, and omit parameters with transliteration candidates, according to an illustrative implementation.

A processing circuit 200 diagrammed in FIG. 2 may receive input text in one language and transmit transliteration candidates associated with the input text in a second language. Processing circuit 200 may also associate and store annotations with candidate characters. Processing circuit 200 may also associate and store reorderings and omit parameters. Processing circuit 200 may then transmit transliteration candidates with associated annotations, in the order specified by the user, and including only those candidates permitted by the user. Processing circuit 200 may be in client 102 (FIG. 1) or server 104 (FIG. 1). In other implementations, some elements of processing circuit 200 are in the processing circuit of client 102 while other elements are in the processing circuit of server 104.

Processing circuit 200 may include a processor 108. Processor 108 may associate input text with entries in memory. Processor 108 may associate user annotations received in a personalized transliteration interface with corresponding transliteration candidates. Processor 108 may receive and access a user-specified order for the transliteration candidates and transmit transliteration candidates in the user's preferred order. Processor 108 may receive and access a user parameter to not transmit a particular transliteration candidate. Processor 108 may include a microprocessor, ASIC, FPGA, etc., or combinations thereof.

Processing circuit 200 may include an input 218 and output 220. Text may be received at the processing circuit via input 218. Input 218 may be an input device, as in an input device 118 (FIG. 1) on a client 102 (FIG. 1). Input 218 may also be a client device 102, when input 218 is on a processing circuit of server 104 (FIG. 1). The processing circuit may transmit transliteration candidates and annotations via output 220. Output 220 may be a display device 112 (FIG. 1) on a client device 102. Alternatively, output 220 may be a client device 102, when output 220 is on a processing circuit of server 104 (FIG. 1).

Processing circuit 200 may include a memory 204. Memory 204 may store machine instructions that, when executed by processor 202, cause processor 108 to perform one or more of the operations described herein. Memory 204 may store data related to a personalized transliteration interface. This data may include data based on usage of the personalized transliteration interface, annotations added by a user, and a transliteration dictionary. Data stored on memory 204 may be split across multiple devices. For example, annotations 208 may stored on client 102 (FIG. 1) and transliteration dictionary 214 may be stored on server 104 (FIG. 1).

Memory 204 may include a transliteration dictionary 214. Through FIG. 2 depicts only one transliteration dictionary, other implementations may include more than one transliteration dictionary. Transliteration dictionary 214 may store data related to identifying words phonetically spelled in one language and candidate characters associated with the input text in a second language. Transliteration dictionary 214 may be composed of different entries. Transliteration dictionary 214 may store phonetic spellings of words in a first language. The dictionary may include words formatted in the second language system that the language conversion system may identify as potentially corresponding to input in the first language system. For example, homophones in a second language that the personalized transliteration interface would associate with the input text may also be stored. The dictionary can be configured to allow new information to be stored and associated with an entry.

According to one implementation, a transliteration dictionary 214 contains a general dictionary 218 and a user dictionary 216. General dictionary 218 may include general, public terms that may be relevant for large groups of people. In some implementations, general dictionary may be a standard dictionary that is used for many or all users of the personalized transliteration interface. In some implementations, general dictionary may be configured to include terms obtained from public knowledge sources such as dictionaries, encyclopedias, online data sources, repositories of terms (e.g., slang terms), and/or other types of sources that are not necessarily specific to any particular user. A user dictionary can be a set of dictionary entries that were created by and/or for the user. Users may sometimes wish to input terms that may not be a part of general dictionary but may be terms that have particular meaning or relevance for the users themselves. For example, users may wish to input a name of a friend or a contact on a social network, a name of a business or street near their home, a screen name of an individual on a messaging service, and/or other types of information that may be useful to the users but may not be included within general dictionary.

Memory 204 may include a user data 206. User data may be received in memory 204 via input 218. User data 206 may include data that identifies a particular user and his or her preferences. User data 206 may enable an transliteration interface to store and/or access annotations, reorderings, omit parameters that are unique to one user. User data 206 may enable a user to access information unique to the user on different client devices. In other implementations, annotations, reorderings, and omit parameters are accessible to all users of a personalized transliteration interface of a client device. If a user so chooses, the user data 206 may store the input words entered by the user or the number of times a particular candidate word has been chosen. The user history can be configured to allow new information to be stored and associated with an entry in the transliteration dictionary 214. This information can be related to a personalized transliteration interface. In some implementations, the user history can store annotations, user-specific orderings for where the word should appear in a candidate list, or whether a word should appear at all in a candidate list.

Memory 204 may also include annotations 208, reordering 210, and omit parameters 212 Annotations 208, reorderings 210, and omit parameters 212 may be received at the processing circuit via input 218. Input 218 may be an input device on a client or the client itself. Output 220 may transmit annotations 208, reorderings 210, and omit parameters 212 from a server to a client or from a client to a display device. The data stored in annotations 208, reorderings 210, and omit parameters 212 may be stored as code executable by processor 202. For example, omit parameters may be stored as part of code that causes processor to transmit transliteration candidates except for the candidate associated with the omit parameter.

While FIG. 2 depicts storage of annotations 208, reorderings, 210, and omit parameters 212 as separate, they are stored together as personalization options in some implementations. Also, annotations 208, reorderings 210, and omit parameters 212 may be stored as part of user data 206, user dictionary 216, or general dictionary 218 in other implementations.

Annotations 208 include text strings of various lengths. The text strings may describe the context in which a particular character is used, e.g., "business." In other implementations, the annotation is single character (e.g., an asterisk). The single character may allow for a candidate character to be quickly annotated. A single character annotation may be in lieu of a text string annotation or in addition to a text string annotation. Annotations may be received from and personalized to a user. A user may also receive a personalized transliteration interface with annotations already associated with candidate characters. This may be the case in an enterprise setting, where a manager has created annotations and distributed annotations for a set of users.

Reorderings 210 may include data for a term to display in a fixed position on a candidate list. For example, certain characters or character strings could be reordered to be in the first position when provided from a server to client or from a client to a display. The reordering may place a character set in a position relative to a second character set. For example, certain characters could be ordered one position ahead of certain other characters when the transliteration candidates are provided. Reorderings may be received from and personalized to a user, or they could be received by a third party and distributed to one or more users.

Omit parameters 212 include a user preference for a term to not appear in a candidate list. The user omit parameters may be defined to hide a candidate in a candidate list. For example, among homophones of a particular input character, the omit parameter may specify that a certain homophone is not to be included in subsequent transliteration candidate lists associated with the input character. The user may choose to hide the candidate characters because the user believes he or she will not use the characters. If a candidate character is hidden, it will not appear in a candidate list, but it will remain stored in memory. The personalized transliteration interface can be configured to allow a user to remove an omit parameters associated with a candidate word (so that the candidate word is no longer hidden and will appear in candidate lists). The omit parameter may delete a candidate from the memory. When a candidate is deleted from the memory, the candidate is no longer accessible to the personalized transliteration interface. In some implementations, the transliteration interface is configured to allow the user to choose whether the omit command hides or deletes a candidate character. Omit parameters may be received from and personalized to a user. They could be received by a third party and distributed to one or more users. This may occur in a home environment, where a parent chooses to limit access to certain characters by children.

Memory 110 may include, but is not limited to, electronic, optical, magnetic, or any other storage or transmission device capable of providing processor 108 with program instructions. Memory 110 may include a floppy disk, CD-ROM, DVD, magnetic disk, memory chip, ASIC, FPGA, ROM, RAM, EEPROM, EPROM, flash memory, optical media, or any other suitable memory from which processor 108 can read instructions. The instructions may include code from any suitable computer programming language such as, but not limited to, C, C++, C#, Java, JavaScript, Perl, Python and Visual Basic.

Figure 3:
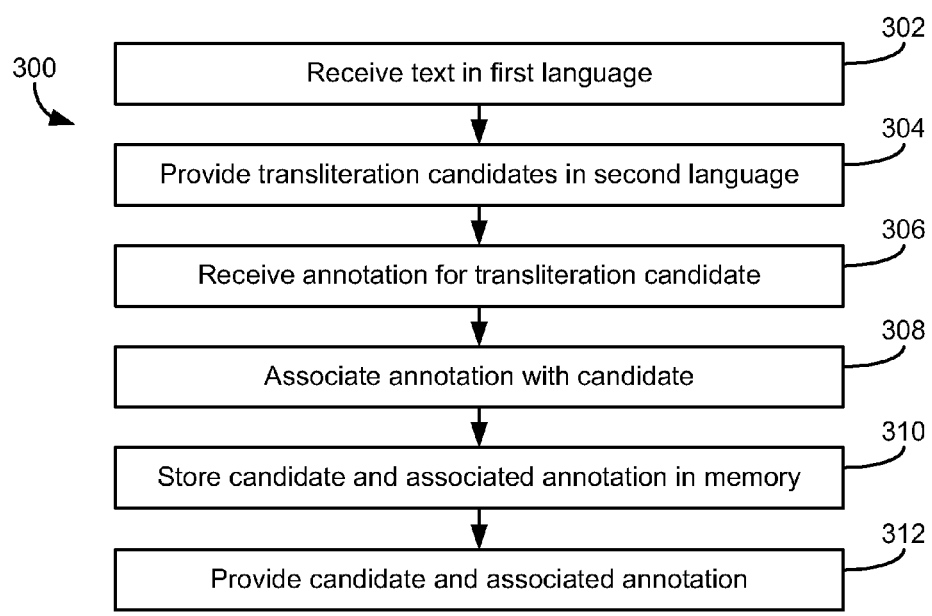
FIG. 3 is a flow diagram of a process for receiving, associating, storing, and providing an annotation, reordering, or omit parameter with a transliteration candidate, according to an illustrative implementation.

FIG. 3 illustrates a flow diagram of a process 300 for associating and transmitting an annotation with a transliteration candidate. In some implementations, process 300 could be completed by a server device or by a client device. In other implementation, some of process 300 could be completed on a server device and the remainder on a client device.

Process 300 includes receiving text in a first language (302). The input may be received from an input device (e.g., input device 118 of client 102), or it may be received at a server 104 from a client 102. Input characters may be received in the same language as the language of the candidate words retrieved by transliteration interface. For example, the server may receive Japanese characters and retrieve Japanese characters. The server may receive characters of one script of a language and output characters in another script of the same language. For example, the server may receive Japanese hiragana characters and retrieve Japanese kanji characters. Alternatively, the server may receive input in one language and retrieve characters in another language. For example, the server may receive Chinese pinyin characters (Chinese words phonetically spelled with Roman/Latin letters) and retrieve Chinese characters. The personalized transliteration interface may use a transliteration dictionary to output characters in the language and script desired by the user. For example, a smartphone, as an illustrative client device, configured with a personalized transliteration interface may receive the input characters "tóng" (302). "Tóng" is Chinese pinyin, received in English.

Process 300 includes providing transliteration candidates in a second language (304). The personalized transliteration database may access a processing circuit on client 102 (FIG. 1) or server 104 (FIG. 1) to retrieve Chinese characters associated with "tóng." A transliteration dictionary 214 (FIG. 2) may provide homophones of the input word in Chinese characters. The transliteration candidates (with corresponding definition) for "tóng" may include "铜" (copper), "同" (like, as in same or similar), "彤" (red), "侗" (boy or child), "仝" (concrete), and "茼" (chrysanthemum coronarium). All of the transliteration candidates are pronounced "tóng," but the candidates all mean different things. The processing circuit provides the transliteration candidates for display on a client device or from a server to a client device.

Process 300 includes receiving a user annotation for a transliteration candidate (306). The annotation may be received from an input device 118 on client 102, or it may be received at server 104 from client device 102. The annotation may be a text string. A user may input what the annotation will be, and the annotation may be personal to the user. The text string may be used to indicate what contexts the character is used in. For example, a user may be writing a user manual for which there is a rule established that a certain set of characters is to be used. This situation may arise when there is a need for standardization in the terms used. The standard characters that are to be used could be annotated with the text string "User Manual." The annotation may alert that user as to which characters are to be used. In other implementations, the annotation is single character (e.g., an asterisk). The single character may allow for a candidate character to be quickly given prominence over other candidates in the list. In the example above, a user could choose to annotate the candidate character "铜," which means copper, with a text string "chemistry" to identify the context the character is used. A personalized transliteration interface may also be configured to receive a user reordering, which specifies where in the list of transliteration candidates the associated candidate should be provided. For example, the user may reorder the candidate "彤," meaning red, so that it is always in the first position in a list of homophones of "tóng." The personalized transliteration interface may also be configured to receive an omit parameter, which specifies that the associated candidate should not be provided in candidate list. For example, a user who does not write about plants may choose to omit the character for a type of plant "茼," chrysanthemum coronarium, from the list of homophones of "tóng."

Process 300 includes associating the user annotation with its corresponding candidate character (308). A processor 202 on processing circuit 200 may be involved in associating the user annotation with a transliteration candidate. In the example above, the annotation "chemistry" would be associated with the candidate character "铜," meaning copper. A personalized transliteration interface may also be configured to associate a user reordering or a user omit parameter with a candidate character.

Process 300 includes storing the user annotation and association with a candidate character in memory (310). The annotation may be stored in annotations 208, user data 206, or transliteration dictionary 214, depending on the implementation of the personalized transliteration interface. The annotation may be stored on client device 102 or server 104, according to the particular implementation. In the example, the text string annotation "chemistry" and the association with the candidate character "铜" is stored in memory. A personalized transliteration interface may also be configured to store a user reordering or a user omit parameter, and the association with a candidate character, in a memory. The memory may be a memory 204 of processing circuit 200 (FIG. 2). In some implementations, the memory 204 may store the annotations, reorderings, and omit parameters, and their associations with candidate characters, in annotations 208, reorderings 210, and omit parameters 212. Annotations, reorderings, and omit parameters may be stored as part of user data 206, user dictionary 216, or general dictionary 218, in other implementations.

Process 300 includes providing transliteration candidates and corresponding annotations (312). The candidate and annotation may be provided from a server 104 to a client 102, or from a client to a display 112. In the example above, "chemistry" is provided with " 铜 " when " 铜 " is a transliteration candidate of some input text. If a transliteration candidate is associated with a user reordering, providing the transliteration candidates may be in the order specified by the associated reordering. If a transliteration candidate is associated with an omit parameter, providing the transliteration candidates may include omitting the candidate word associated with the omit parameter.

While FIG. 3 describes receiving and storing, and then providing the annotations, reorderings, and omit parameters as distinct, the two are combined in other implementations. In one implementation, the personalized transliteration interface could refresh the list of candidates at a fixed time interval (e.g., 3 seconds). In such an implementation, an annotation could be received and stored, and then provided after the fixed time interval. The annotation may be provided even before a user has chosen a particular candidate character from the candidate list. With a fast refresh rate, the client device would display the annotation in "real-time." In other implementations, the candidate list may be refreshed whenever a new user annotation, user reordering, or user omit parameter is received.

While FIG. 3 may have described the processes for receiving and delivering annotations, reorderings, and omit parameters as distinct, in other implementations, the processes could be completed simultaneously. For example, a personalized transliteration interface may simultaneously receive and store, and display, an annotation and a reordering for a single candidate character.

FIGS. 4, 5A-5B, 6A-6B, 7A-7B are display images of the personalized transliteration interface 400, according to an illustrative implementation.

Figure 4:
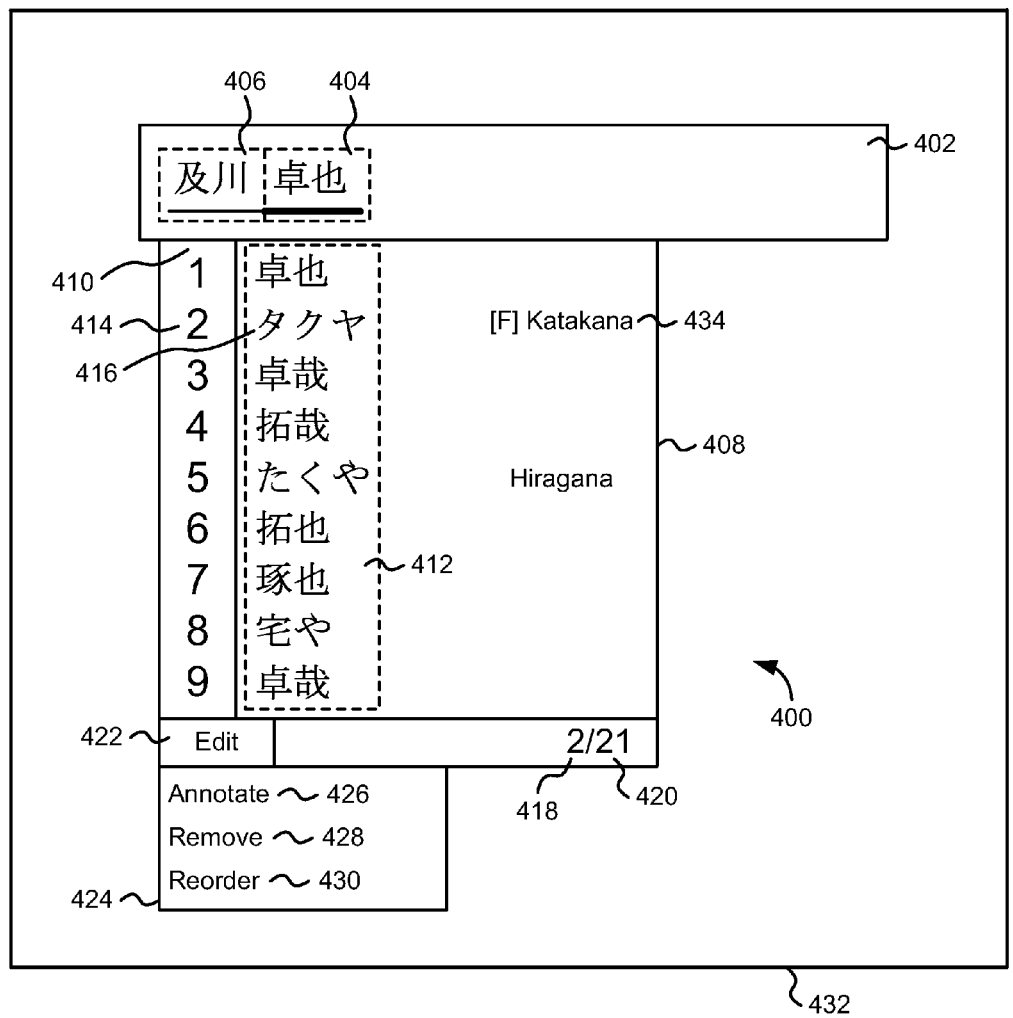

FIG. 4 is a display image of a personalized transliteration interface 400, according to illustrative implementation. FIG. 4 is display data that is viewed by a user on a display device, such as a monitor. According to one implementation, the client device 102 transmits the interface depicted in the FIG. 4 to the display 112 of the client device. According to some implementations, an application may be provided on client device 102 that receives input from a user and transmits the input to a server-based transliteration system that is configured to convert the input into one or more output options in a second language system or format and provide the output options to client device 102. In some implementations, the personalized transliteration interface may be provided from a server 104 to a client 102 via a web-based application and/or an application resident on a client device 102.

In FIG. 4, personalized transliteration interface 400 is displayed on a display device 432. Personalized transliteration interface 400 consists of a character input field 402, candidate window 408, edit field 422, and personalization menu 424. Character input field 402 receives input from a user in the form of letters or characters 404, 406. Characters 404 are characters currently being edited by the user. Characters 406 are characters that have already been entered and for which a homophone candidate has already been selected by the user. After the characters 404 have been entered, candidate characters 412, which are homophones of the active characters, are displayed in a candidate window 408. Script identifier 434 may alert the user that a candidate character is in a script (e.g., Japanese katakana) of a given language different than the other candidates (e.g., Japanese kanji). Shortcut panel 410 contains the numbers "1" through "9," which may correspond to the numeric keys on the user's input device, in some implementations. A user may select characters 416 by depressing the "2" numeric key on the input device. Other input devices, such as a mouse, can be used to select characters in other implementations. Selecting characters 416 makes those characters active. Active candidate characters can be the characters the user intends to insert in character input field 402. The position of the active candidate characters on the candidate list is indicated in an active character display 418. Adjacent, in some implementations, to the active character display 418 is a total candidate counter 420. The total candidate counter 420 displays the total number of candidates that were retrieved from the memory. Selecting and unselecting edit field 422 shows and hides personalization menu 424. Personalization menu 424 allows the user to select annotate field 426, remove field 428, or reorder field 430. Selecting annotate field 426, remove field 428, or reorder field 430 causes the personalized transliteration interface to display options unique to each personalization option, in some implementations. The display images for some of these implementations are in FIGS. 5A-5B, 6A-6B, and 7A-7B.

Figures 5A, 5B:
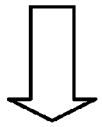

FIGS. 5A-5B are display images of candidate window 408 configured to receive and display an annotation. The process associated with these display images is illustrated with a flow diagram in FIG. 3. Candidate window 408 is displayed on a display device 432. Referring to FIG. 5A, annotation fields 504 appears proximate to each candidate character 502 when a user selects annotate field 426 from personalization menu 424 (FIG. 4), according to one implementation. A user can enter a text string "Chrome TLM" in annotation field 504, which is proximate to candidate characters "卓也" 502. "Chrome TLM" may be a job title associated with a person using the candidate characters "卓也" to spell his name. Referring to FIG. 5B, when the candidate list is compiled again, i.e., after the annotation has been received and stored by the personalized transliteration interface, the annotation 506 "Chrome TLM" appears proximate to the candidate characters "卓也". In other implementations, the user may be able to enable and disable a single character annotation, such as an asterisk, proximate to the character. A single character annotation field may occupy the same position as annotation field 504, in some implementations, and may be adjacent to annotation field 504 in other implementations.

FIGS. 6A-6B are display images of candidate window 408 configured to receive and display a user reordering. Candidate window 408 is displayed on a display device 432. Referring to FIG. 6A, reordering options 606 appears proximate to each candidate character 602, 604 when a user selects reorder field 430 from personalization menu 424 (FIG. 4), according to one implementation. Reordering options 606 may include promote field 614 and demote field 608. Selecting promote field 614 associates the corresponding candidate characters (here candidate characters "タクヤ" 604) with a position on the candidate list higher than its original position. Selecting demote field 608 associates the corresponding candidate characters a position on the candidate list lower than its original position. The reordering may fix the position of the candidate characters "タクヤ" 604 in a specific position on the list (e.g., the first position 610 on the candidate list). Or the reordering may position the candidate characters "タクヤ" 604 relative to the other candidate characters "卓也" 602 (e.g., candidate characters "タクヤ" 604 are displayed one position higher than candidate characters "卓也" 602). FIG. 6B is the display image after promote field 614 has been selected and the candidate list compiled again. Candidate characters "タクヤ" 604 originally occupied the second position 612 on the candidate list in FIG. 6A. After the promote field 614 was selected, candidate characters "タクヤ" 604 occupy the first position 610 on the candidate list (FIG. 6B). The candidate characters "卓也" 602 which previously occupied the first position 610 (FIG. 6A), occupy the second position 612 (FIG. 6B) after the reordering of candidate characters "タクヤ" 604.

Figure 7A:
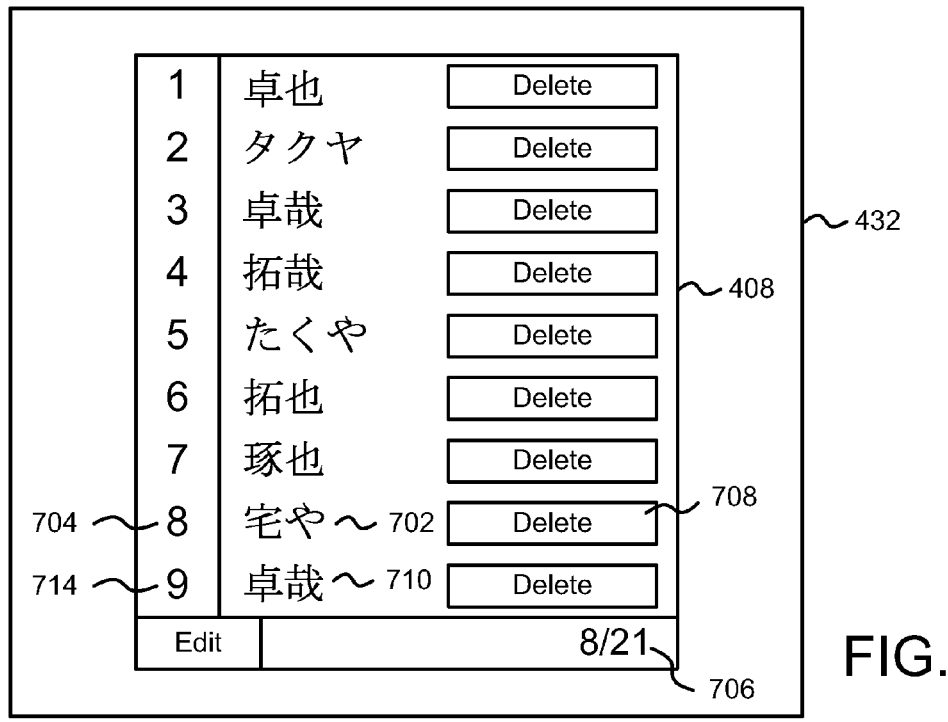
Figure 7B:
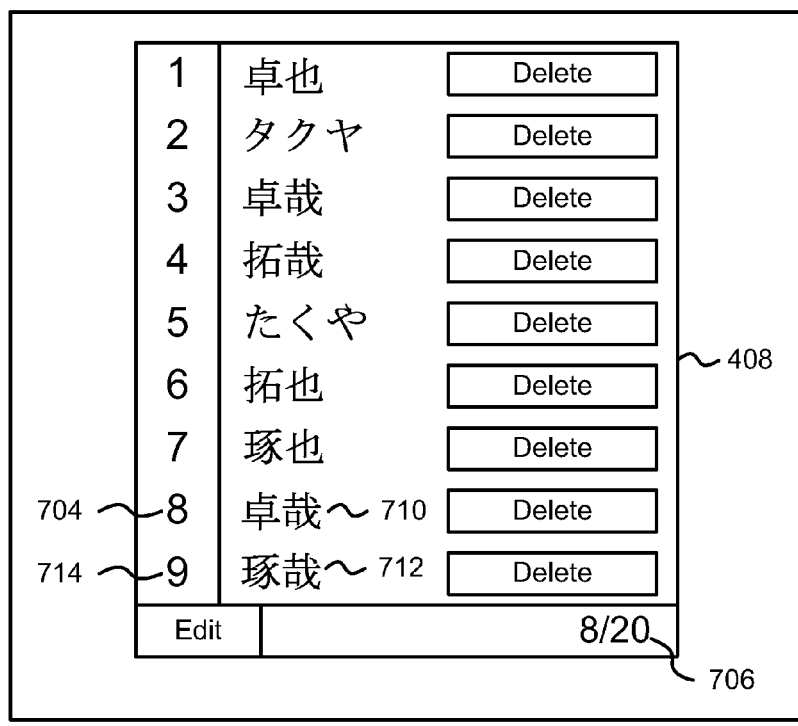

FIGS. 7A-7B are display images of candidate window 408 configured to receive omit parameters and display candidates not associated with omit parameters. Candidate window 408 is displayed on a display device 432. Referring to FIG. 7A, delete options 708 appear proximate to each candidate character when a user selects remove field 428 from personalization menu 424 (FIG. 4). A user may select delete option 708, which is displayed proximate to candidate characters "宅や" 702. In doing so, the user chooses to remove candidate characters "宅や" 702, which occupied the eighth position 704 (FIG. 7A), from the candidate list. When the list is compiled thereafter, the candidate characters "卓哉" 710, which previously occupied the ninth position 714 (FIG. 7A), now occupy the eighth position 704 (FIG. 7B). Candidate characters "宅や" 702 no longer appear in the candidate list in FIG. 7B because the candidate is associated with a user omit parameter (as a result of the user selecting delete option 708). Candidate characters "琢哉" 712, which were not listed in the candidate window previously, appear in the candidate window in the ninth position 714 after candidate characters "宅や" 702 were removed. The total candidate counter 706 also reflects that a character has been omitted. In FIG. 7B, the counter is one less than in FIG. 7A, which is the result of omitting candidate characters 702.

In alternative embodiments, the personalized transliteration interface may be configured to receive input terms and provide homonyms, heterographs, homographs, heteronyms, synonyms, antonyms, and/or other terms related to the input term, such as translations other than transliterations.

While some implementations are described herein with reference to actively personalizing a candidate list in a transliteration interface, it is to be appreciated that other implementations may also utilize the described methodologies. In some implementations, the personalized transliteration interface may be part of a text editor or other application configured to display a document. For example, the personalized transliteration interface may be integrated into a spreadsheet application to allow multilingual searches to be performed. In other implementations, the functionality of the personalized transliteration interface may be integrated into an Internet search engine to allow personalization of predictive search options. Active personalization may also be implemented on auto complete systems. For example, a mobile phone text editor that predicts a word the user is intending to input may be configured with active personalization. The list of auto complete options may be annotated, reordered, or candidates may omitted as described above.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode),TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. For example, while certain implementations are described herein with respect to routing data in a data network, the methodologies described could also be applied to other areas, such as determining the best routes of a map that may be traveled by a person or vehicle. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computerized method of annotating a candidate word in a user interface, the user interface configured to receive an input word in a first language and provide candidate words in a second language, the method comprising:
   receiving, at a processing circuit, in the user interface an input word in the first language;
   providing display data configured to cause an electronic display to display a list of candidate words in the second language, wherein the candidate words are homophones of the input word;
   receiving, at the processing circuit, a user annotation about a candidate word;
   associating, at the processing circuit, the user annotation with the candidate word;
   storing, in the memory, the user annotation and the association with the candidate word; and
   providing display data configured to cause an electronic display to display the user annotation when the candidate word is provided thereafter.

2. The method of claim 1, wherein the user annotation comprises a text string.

3. The method of claim 2, wherein the user annotation can be inputted via an input field displayed proximate to the candidate word in an electronic display.

4. The method of claim 1, wherein the user annotation comprises one character, and wherein the user annotation is configured to be enabled and disabled by an input field displayed proximate to the candidate word.

5. The method of claim 1, wherein the memory is configured to store at least one of user data comprising a history of the words received from the user, a user dictionary personalized to the user, or a general dictionary not personalized to the user.

6. A non-transitory computer-readable storage medium having instructions stored thereon that, when executed by a server computer, cause the server computer to perform operations comprising:
   communicating with a user interface on a client device, the user interface being configured to receive an input word in a first language from a user, to provide to the user candidate words in a second language that are homophones of the input word, and to receive a user annotation associated with a candidate word;
   receiving, from the client device, the user annotation associated with the candidate word; and
   storing the user annotation associated with the candidate word in a server-side memory operably coupled to the server computer, wherein when a candidate list is compiled thereafter, the user annotation is displayed proximate to the candidate word in the candidate list.

7. The non-transitory computer-readable storage medium of claim 6, the operations furthering comprising serving the user interface from the server computer to the client device.

8. The non-transitory computer-readable storage medium of claim 6, wherein the input word is received at the server computer, the operations further comprising providing the candidate words from the server computer to the client device.

9. The non-transitory computer-readable storage medium of claim 6, the operations furthering comprising:
   associating the user annotation with the candidate word; and
   providing the candidate words and user annotations associated with the candidate words from the server computer to the client device.

10. The non-transitory computer-readable storage medium of claim 6, the operations further comprising serving the candidate words and user annotations associated with the candidate words to a second client device.

11. A non-transitory computer-readable storage medium having instructions stored thereon that, when executed by a server computer, cause the server computer to perform operations comprising:
   communicating with a user interface on a client device, the user interface being configured to receive an input word in a first language from a user, to provide to the user candidate words in a second language that are homophones of the input word, and to receive a user parameter to omit a candidate word from a candidate list;
   receiving, from the client device, the user omit parameter; and
   storing the user omit parameter in a server-side memory operably coupled to the server computer, wherein when a candidate list is compiled thereafter, the candidate list omits the candidate word associated with the user omit parameter.

12. The non-transitory computer-readable storage medium of claim 11, the operations furthering comprising serving the user interface from the server computer to the client device.

13. The non-transitory computer-readable storage medium of claim 11, wherein the input word is received at the server computer, the operations further comprising providing the candidate words from the server computer to the client device.

14. The non-transitory computer-readable storage medium of claim 11, the operations furthering comprising:
   associating the candidate word with the user omit parameter; and
   providing, when the input word is received from the client device thereafter, from the server computer to the client device the candidate words that are homophones of the input word except for the candidate word associated the user omit parameter.

15. The non-transitory computer-readable storage medium of claim 14, the operations further comprising serving to a second client device candidate words that are homophones of the input word except for the candidate word associated the user omit parameter.

16. A non-transitory computer-readable storage medium having instructions stored thereon that, when executed by a server computer, cause the server computer to perform operations comprising:
- communicating with a user interface on a client device, the user interface being configured to receive an input word in a first language from a user, to provide to the user candidate words in a second language that are homophones of the input word, and to receive a user reordering of a candidate word in a candidate list;
- receiving, from the client device, the user reordering, wherein the user reordering specifies a fixed position for the candidate word or a position relative to a second candidate word in a candidate list; and
- storing the user reordering in a server-side memory operably coupled to the server computer, wherein when a candidate list is compiled thereafter, the candidate word is displayed in the position specified by the user reordering.

17. The non-transitory computer-readable storage medium of claim 16, the operations furthering comprising serving the user interface from the server computer to the client device.

18. The non-transitory computer-readable storage medium of claim 16, wherein the input word is received at the server computer, the operations further comprising providing the candidate words from the server computer to the client device.

19. The non-transitory computer-readable storage medium of claim 16, the operations furthering comprising:
- associating the candidate word with the user reordering; and
- providing, when the input word is received from the client device thereafter, from the server computer to the client device the candidate words in the order specified by the associated the user reorderings.

20. The non-transitory computer-readable storage medium of claim 19, the operations further comprising serving to a second client device candidate words that are homophones of the input word in the order specified by the associated user reorderings.

* * * * *